UNITED STATES PATENT OFFICE.

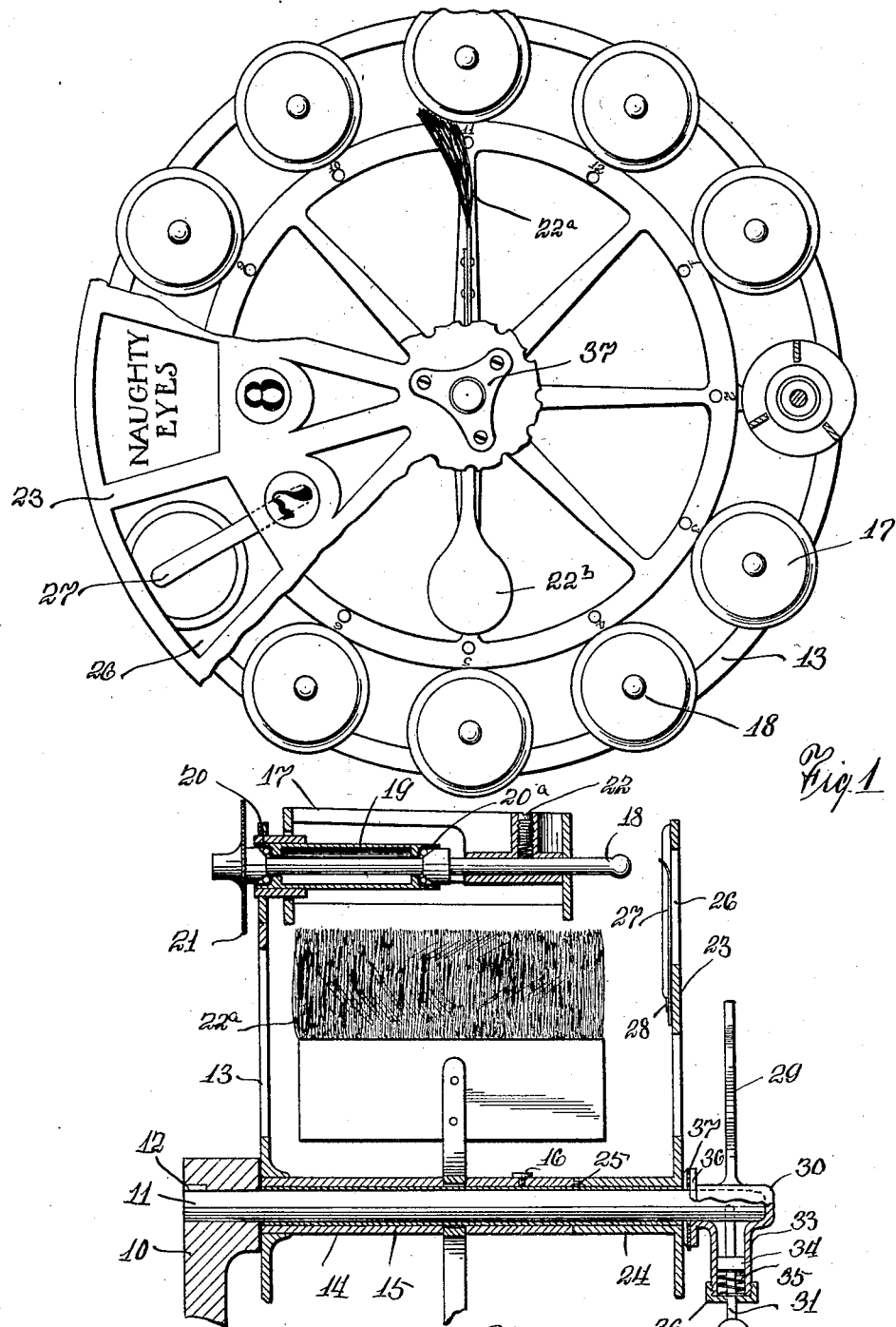

JULIUS ROEVER, OF NEW YORK, N. Y.

MULTIPLE PHONOGRAPH.

1,049,923. Specification of Letters Patent. Patented Jan. 7, 1913.

Application filed May 11, 1910. Serial No. 560,569.

*To all whom it may concern:*

Be it known that I, JULIUS ROEVER, of the city of New York, county of Queens, and State of New York, have invented a new and useful Improvement in Multiple Phonographs, of which the following is a full, clear, and exact description.

My invention relates to improvements in multiple phonographs in which a wheel is used, the said wheel carrying on its circumference a series of records which are brought in turn or as desired beneath the reproducing mechanism. Machines of this kind are used in public places and are operated after dropping in a coin, and it is necessary and desirable occasionally to change the records and give a new list of pieces or tunes.

The object of the present invention is to provide a device for supporting the records so that they may be easily and quickly changed, and so that when changed the machine may be assembled for operation again without any chance of jamming of the different parts so that there will be too much friction for the proper running of the mechanism. To this end I provide a rotatable record wheel carrying record holders near its periphery, the record holders being supported by the wheel only at one end of the holder and at right angles to the surface of the wheel. The records are changed by merely slipping them off and on the holder. In connection with the record wheel I provide a disk rotatable with the wheel and having cards or other means secured thereto indicating the name of the tune or piece of the corresponding record on the wheel, and an indicator set at a point where it is necessary to stop in order to have a desired record brought under the stylus of the reproducer.

Reference is to be had to the accompanying drawings forming a part of this invention, in which similar reference characters indicate corresponding parts in all the views.

Figure 1 is a broken front elevation of a machine showing my improvements, and Fig. 2 is a cross sectional view through the center and the upper part of the same.

I have shown the invention in connection with the post or support 10 which supports the horizontal shaft 11, said shaft being held stationary in the post by the lug 12. The record wheel 13 is mounted upon the sleeve 14 which is carried by the shaft 11 and rotated thereon. Between the sleeve 14 and the shaft 11 I provide a bearing sleeve 15 and a set screw 16 so that the bearing will revolve with the sleeve 14. The record wheel 13 is a metal disk or frame, and is rigidly secured to the sleeve 14 and revolves with it. Along the periphery of the wheel are arranged the record holders 17 which are supported on the horizontal shaft 18. The shaft 18 is supported in the sleeve 19, the latter being rigidly secured to the wheel 13 and carries the ball bearings 20 and 20ª which allows for easy rotation of the shaft 18.

At 21 on the inner end of the shaft 18 I have shown a pinion or friction disk secured to said shaft, which can be operated by any desired mechanism for rotating the shaft and the record holder on it. The record holder proper 17 is mounted on the outer end of the shaft 18 and is held rigidly against the shaft by a set screw 22. It will thus be seen that I provide a means for mounting the record holder on the record wheel so that the outer end of the holder is free, thus making it possible to change the records by merely slipping them off and on over the end of the holder.

At 22ª I have shown a brush loosely hung on the sleeve 14 and having a weighted end 22ᵇ. This brush does not revolve with the sleeve 14 and record wheel 13, but remains in an upright position, by reason of the weighted end 22ᵇ, and therefore as it is arranged to contact with a record, it will keep the record clean from dust and other particles of dirt, while the record is being revolved under the reproducer.

In order that the name of the tune or song upon the record may be indicated to one desiring to use the machine, I provide a disk 23 which is carried on a sleeve 24 and will rotate on the shaft 11 at the same time with the record wheel 13, as the sleeve 24 is locked with the sleeve 14 by the pin 25. Openings 26 are provided near the outer edge of the disk 23, and a spring 27 which is secured at one end 28 to the inner surface of the disk 23, and thus a card bearing the name of the tune upon the phonographic record directly behind it may be supported plainly in view.

In order to provide for centering the record which it is desired to hear beneath the reproducer, I provide an indicator 29 which is rigidly supported on the shaft 11 and points where the record wheel should stop, in order that the desired record may be acted upon by the mechanism of the reproducer. I have not shown the reproducer in the drawings, as it forms no part of my present invention, but it would preferably be placed just above the record wheel 13. The indicator 29 is attached to the thimble 30 which fits over the outer end of the shaft 11, and is held rigidly in place by the spring pressed pin 31. This pin has a head 32 and is movably supported in the casing 33 which forms the lower part of the thimble 30, by the spring 35 which abuts against the collar 34 on the pin and against the nut 36 which is screwed over the end of the casing 33. The spring 35 acting on the collar 34 presses the pin into the depression in the shaft 11, and thus locks the thimble 30 and the indicator 29 firmly in place. The inner edge of the thimble 30 is provided with a collar 36 which abuts against the spring 37. The spring 37 is secured to the outer surface of the disk (see Fig. 1) and thus holds the sleeve 24 snugly against the sleeve 14, locking them firmly by means of the pin 25. The operator, then, in order to change the records, simply pulls down the spring pressed pin 31 and pulls off the thimble 30. The sleeve 24 carrying the disk 23 can then be pulled off and the records changed by simply slipping them off and on the record holders 17. As the record holders are supported on the record wheel 13 only at one end of the holder, it is evident that I provide a very simple and easy means for changing the records. When the records have been changed, the disk is replaced and locked against the sleeve 14, and the indicator and thimble put on and secured to the end of the shaft, and the cards on the disk 23 changed to correspond to the records. It will be seen that even though the man changing the records were careless or incompetent, there is no chance of putting the parts together so that they will be jammed and the mechanism not work perfectly.

I claim:—

1. In a multiple phonograph, the combination of the shaft, a sleeve rotatable thereon, a disk secured to the sleeve, record holders supported on the disk near its periphery and at right angles to the surface thereof, a second sleeve on the shaft abutting with the first sleeve, a disk supported on the second sleeve, locking means on the sleeves so that they will rotate in unison, and a thimble removably secured to the end of the shaft and abutting with the second sleeve.

2. In a multiple phonograph, the combination with the horizontal shaft, a sleeve mounted on the shaft and rotatable thereon, a record wheel rigidly supported on the sleeve, a second sleeve mounted on the shaft and locking with the first sleeve and rotatable therewith, a disk mounted on the second sleeve, a thimble fitting over the end of the shaft and abutting with the disk, means in the thimble to lock it on the shaft, and an indicator rigidly secured to the thimble.

JULIUS ROEVER.

Witnesses:
THOMAS T. SEELYE,
ARTHUR G. DANNELL.

---

Copies of this patent may be obtained for five cents each, by addressing the "Commissioner of Patents, Washington, D. C."